United States Patent
Bernard et al.

(10) Patent No.: US 8,787,885 B2
(45) Date of Patent: Jul. 22, 2014

(54) SYSTEM FOR CONTROLLING ACCESS TO A SERVICE, AND CORRESPONDING METHOD, CONTROL DEVICE, AND COMPUTER PROGRAM

(75) Inventors: Emmanuelle Bernard, Paris (FR); Sophie Aveline, Paris (FR)

(73) Assignee: Orange, Paris (FR)

( * ) Notice: Subject to any disclaimer, the term of this patent is extended or adjusted under 35 U.S.C. 154(b) by 340 days.

(21) Appl. No.: 12/442,783

(22) PCT Filed: Oct. 16, 2007

(86) PCT No.: PCT/FR2007/052169
§ 371 (c)(1),
(2), (4) Date: May 6, 2009

(87) PCT Pub. No.: WO2008/047041
PCT Pub. Date: Apr. 24, 2008

(65) Prior Publication Data
US 2010/0081413 A1 Apr. 1, 2010

(30) Foreign Application Priority Data

Oct. 17, 2006 (FR) ...................................... 06 54328

(51) Int. Cl.
*H04M 3/42* (2006.01)
(52) U.S. Cl.
USPC .................. 455/414.1; 455/414.2; 455/435.1; 455/435.2; 455/434; 455/464
(58) Field of Classification Search
USPC ............. 455/414.1, 414.2, 435.1, 435.2, 434, 455/464
See application file for complete search history.

(56) References Cited

U.S. PATENT DOCUMENTS

| 6,621,816 B1 * | 9/2003 | Tadamura et al. ............. 370/389 |
| 2002/0111166 A1 * | 8/2002 | Monroe ......................... 455/435 |
| 2003/0064730 A1 * | 4/2003 | Chen et al. .................... 455/453 |
| 2009/0285166 A1 * | 11/2009 | Huber et al. .................. 370/329 |

FOREIGN PATENT DOCUMENTS

| WO | WO 00/54537 A2 | 9/2000 |
| WO | WO0054537 * | 9/2000 |
| WO | WO 03/096732 A1 | 11/2003 |

* cited by examiner

*Primary Examiner* — Khai M Nguyen
(74) *Attorney, Agent, or Firm* — Drinker Biddle & Reath LLP

(57) ABSTRACT

The invention relates to a system for controlling access to a service offered by a communications network. According to the invention, such a service is accessible via a plurality of private access stations to the communications network, such as home gateways (HG1, HG2, HG3), which are into an access network dedicated to the service. A separate location area (LA1, LA2, LA3) is assigned to each of the home gateways (HG1, HG2, HG3). At least one controller (11) associated with the home gateways is adapted to use, in the event of a location updating procedure initiated by a user terminal:
means for determining a category to which the user belongs; and
means for controlling access by the user terminal to one of the home gateways as a function of the category so determined, these means being adapted, in the event of refusal of access by said user terminal to one of said home gateways (HG1, HG2, HG3), to send said terminal a refusal message including a rejection cause that is a function of the category determined for said user.

11 Claims, 2 Drawing Sheets

SYSTEM FOR CONTROLLING ACCESS TO A SERVICE, AND CORRESPONDING METHOD, CONTROL DEVICE, AND COMPUTER PROGRAM

CROSS-REFERENCE TO RELATED APPLICATIONS

This application is the U.S. national phase of the International Patent Application No. PCT/FR2007/052169 filed Oct. 16, 2007, which claims the benefit of French Application No. 06 54328 filed Oct. 17, 2006, the entire content of which is incorporated herein by reference.

FIELD OF THE INVENTION

The field of the invention is that of radiocommunications. To be more precise, the invention relates to a system for controlling access to a service offered by a communications network operator.

It applies in particular, but not exclusively, to second generation and third generation communications systems such as the GSM, GPRS, and UMTS, and future evolutions thereof, and also to communications systems using a CDMA (Code Division Multiple Access) technology.

BACKGROUND OF THE INVENTION

A mobile telephone network, for example a UMTS (Universal Mobile Telecommunications system) network, conventionally consists of a wireless access network, comprising a plurality of public access stations, known as base stations, and a core network that handles management of the service offered and routing of calls to fixed networks such as the public switched telephone network, the Internet, etc. Such mobile telephone networks are generally organized in cells, each associated with a base station, and the size of which varies as a function of the user density, the geography of the terrain, the power of the associated base station, etc. In a GSM network, for example, the adjacent cells of the network use different carrier frequencies.

Each mobile telephone network is managed by an operator, is associated with a geographical area (conventionally a state), and is identified by a PLMN (Public Land Mobile Network) code that is specific to it.

A mobile terminal can access only the mobile telephone network managed by the operator of its subscription or possibly another network with which its operator has entered into reciprocal roaming agreements. After being connected to a PLMN for which it is authorized, the mobile terminal monitors signals coming from the various access stations that it receives, selects the signal received with the best quality, and attaches to the cell from which it comes.

The terminal effects this monitoring on a quasi-permanent basis, with the result that, as soon as it detects a signal coming from a new base station, it measures certain parameters of the signal received in order to determine whether it is of better quality than the signal coming from the cell to which it is currently connected. If so, and if the terminal is in idle mode, it can quit its current cell and attach to the cell from which it is receiving a signal of better quality.

If the terminal is in connected mode (i.e. if a call is in progress), the network requests it to send back measurements on the adjacent cells. The network can then instruct the mobile terminal to change cell. In practice, this handover occurs mainly when the mobile terminal is moving around, causing it to enter or leave a cell whose size is normally in the range 100 meters (m) to 30 kilometers (km) in a GSM or UMTS network, for example.

The current expansion of mobile communications networks is now oriented to offering convergence between fixed telephone networks (such as the public switched telephone network (PSTN) or the Internet) and mobile networks.

In this context, some operators are envisaging offering their customers, whether private persons or businesses, second generation (2G), third generation (3G), or beyond third generation (B3G) wireless coverage in the home or on business premises, for example in the form of a private wireless access station (in the home or on business premises), connected to an ADSL (Asynchronous Digital Subscriber Line) modem or to any other equipment providing access to a high-bit-rate network (for example of the FTTH (Fiber To The Home) type). Below, for reasons of simplification, the term private wireless access station designates the combination of the access station proper and the high-bit-rate network access equipment to which it is connected.

Each person can therefore have their own home wireless access station, associated with a list of users authorized to access it (family members, friends, etc.). An access control mechanism could bar access to this private station to users not included in the list.

Similarly, in the business context, a business could have one or more wireless access stations on its site, access to which would be limited to the employees of the business and prohibited to visitors, for example.

However, introducing this kind of home wireless coverage service encounters the problem of increasing the number of access stations to the communications network of the operator, a large number of such access stations being likely to be added to the base stations (public access stations) already deployed by the operator.

A mobile terminal moving around in the communications network of the operator would frequently detect new signals coming from public or private access stations near it and to which it could thus be tempted to attach.

Thus a mobile terminal moving around in a built-up area or in a building in which all homes are equipped with private access stations to the service would tend to be tempted to attach to each of those stations in succession, as soon as it detected that the signal from one of them is of sufficient level.

Now, throughout the stage in which a mobile terminal attempts to attach to a wireless access station, is rejected if access is refused, and then attempts to attach again, it cannot be contacted from the communications network; during this period, the duration of which is normally of the order of one second, the mobile terminal ceases to monitor the signals being transmitted in the area in which it is marked as being connected in the network.

If these unsuccessful attempts to attach to private or base stations were to be repeated too frequently, the user of the mobile terminal could miss incoming calls, which is a particular nuisance.

This proves particularly problematic for users of mobile terminals who do not subscribe to the new home wireless coverage service. Introducing a large number of private access stations which they might not be authorized to access because they lack a subscription, would interfere with the operation of their mobile terminals and degrade their performance by leading to multiple attempts to attach the terminals to these private access stations.

There is therefore a need for a technique that enables a communications network operator to offer a new home wireless coverage service to its subscribers, without the new service interfering with users of the network who are not themselves subscribers.

SUMMARY OF THE INVENTION

The invention addresses this need by proposing a system for controlling access to a service accessible via a plurality of private access stations to a communications network, which system comprises:
- means for aggregating said private stations into an access network (PLMN) dedicated to said service;
- means for associating a separate location area (LA) with each of said private stations; and
- means activated in the event of a location updating procedure initiated by a user terminal:
  - for determining a category to which said user belongs; and
  - for controlling access by said user terminal to one of said private stations, as a function of the category so determined.

Furthermore, according to the invention, the access control means are adapted, in the event of refusal of access by said user terminal to one of the private stations, to send the terminal a refusal message including a rejection cause that is a function of the category determined for said user.

Accordingly, by means of the aggregation means of the access control system, the invention constructs a specific access network from private (home or business) access stations, to which there is assigned a specific identifier different from the identifier assigned to the access network consisting of the base stations (public access stations) already deployed by the operator. Using the GSM or UMTS terminology, there is therefore assigned to this new network consisting of private stations, which could be referred to as a "microscopic" network, a specific PLMN code different from the PLMN code of the "macroscopic" network of the operator (consisting of the base stations deployed by the mobile operator). This kind of microscopic PLMN network can be defined as a network that is "equivalent" to the macroscopic network of the operator, in the sense of the "Equivalent PLMN" definition of the 3GPP Technical Specification TS 24.008 V7.4.0 (2006-06), "3rd Generation Partnership Project; Technical Specification Group Core Network and Terminals; Mobile radio interface Layer 3 specification; Core network protocols; Stage 3 (Release 7)".

The invention also proposes to assign a different location area (LA) to each private access station, at least for adjacent private access stations (two private access stations having the same location area can be tolerated if they are very far apart). With reference to the 3GPP Technical Specification TS 24.008 V7.4.0 referred to above, for example, the consequence of this is triggering a mobile terminal Location Area Update procedure when the terminal attempts to attach to a home station.

Clearly, according to the invention, the location areas LA associated with the home stations are very small (typically an apartment or a house—whence the term "micro") compared to the location areas LA of the "macro" network of the operator which, in the GSM, for example, normally consist of a set of cells managed by a single MSC/VLR (Mobile Switching Center/Visitor Location Register).

The invention finally proposes implementing a mechanism for controlling access to these stations in the network.

To this end, the system of the invention includes means enabling it to determine a category to which the user of the mobile terminal belongs (for example the category of subscribers to the home wireless coverage service authorized to access the private station concerned or the category of users who are not authorized to access that station. In the latter category, a distinction can be made between subscribers of the mobile operator who do not subscribe to the home wireless coverage service and non-subscribers of the mobile operator, i.e. national or international "roamers"). The system of the invention can then adapt the access control mechanism as a function of the category of the user that has been determined, and in particular, for non-subscribers to the service, carry out an access control procedure that causes the least disruption and degrades the performance of the mobile terminal as little as possible.

Such means for determining the category of the user and such access control means can be disposed directly in the private access stations, which are then intelligent and autonomous stations.

They can equally be included in one or more controllers associated with these private access stations (which can then optionally also include means for aggregating PLMN network stations and means for associating location areas with those stations). This embodiment reduces the load on the private access stations and thus improves system performance.

They can finally be divided between these two entities: private access stations and controllers. This produces a balanced distribution of tasks, retaining in the private access stations the functions that they can handle without this slowing their performance (for example verifying whether the user is one of the authorized subscribers for the station concerned) and transferring to the controller the functions that consume more resources (for example determining the category of a user not authorized for the station and refusing them access as a function of the category so determined).

Furthermore, in the event of refusal of access by the user terminal to one of the private stations, non-subscribers to the home wireless coverage service are sent a refusal message that rejects them quasi-permanently (i.e. until the mobile terminal is switched off and switched back on again) for the whole of the network consisting of the private access stations. Thus after an unsuccessful attempt to connect to a home access station, a mobile terminal of a user who does not subscribe to the service will no longer attempt to attach to any other private stations encountered, with the result that its operation will be relatively little disturbed by the introduction of the new home wireless coverage service.

According to the invention, determining the category to which a user belongs can be based on comparing at least one identifier of the user with a reference identifier associated with the service.

Accordingly, the controller or the private access station can directly discriminate subscribers to the service on the basis of their identifier (such as their IMSI (International Mobile Subscriber Identity)), which is simple and fast, and does not require consulting an external subscriber database. It is sufficient for the reference identifier associated with the service to be declared in the controller or the private access station for it to know it.

In other words, the invention proposes rejecting user terminals using rejection causes that are differentiated depending on the category of the user.

In another embodiment of the invention, determining the category to which a user belongs can be based on looking up a user in a database of subscribers to the service.

This kind of database can be situated in the network, centralized and consultable by all the private stations and by all the controllers if there is more than one controller in the system of the invention. Accordingly, the users included in the database are subscribers to the service and, conversely, all users not included in the database are considered to be non-subscribers to the service. The controller or the private access station then does not need to store the reference identifier of the service to discriminate between subscribers.

Determining the category to which a user belongs can also be based on a combination of looking up in a database and analyzing the identifier of the user, as in the two embodiments described above.

In one particular embodiment of the invention, the means for determining a category of the user are thus adapted to determine if said user belongs to a list of at least one user authorized to access said private station.

In particular, to enhance the performance of the private station or the controller, the first step is to activate the determination means to verify whether the user belongs to the category of subscribers authorized for the private station concerned. It is only in the event of refusal of access to the private station that the determination means are then activated to determine more precisely the category to which the user belongs: non-subscriber to the home wireless coverage service, national or international "roamer". The access refusal message that is then sent to the mobile terminal contains a rejection cause specific to the category so determined.

The invention also relates to a method of controlling access to a service that can be implemented in a system as described above.

The invention also relates to a device (or controller) for controlling access stations to a communications network, in which, said access stations being private access stations to a service of said network, aggregated into an access network dedicated to said service, and with each of which is associated a separate location area, said control device is adapted to use during a location updating procedure initiated by a user terminal:
  means for determining a category to which said user belongs;
  means for controlling access by said user terminal to one of said private stations, as a function of the category so determined.

The means employed in such a control device are similar to those described above in the context of the access control system of the invention.

The invention further relates to an access network to a service, which comprises:
  a plurality of private access stations to said service, with each of which is associated a separate location area;
  at least one controller associated with said private stations, adapted to use during a location updating procedure initiated by a user terminal:
    means for determining a category to which said user belongs; and
    means for controlling access by said user terminal to one of said private stations, as a function of the category so determined, said access control means being adapted, in the event of refusal of access by said user terminal to one of said private access stations, to send said terminal a refusal message including a rejection cause that is a function of the category determined for said user; and
  at least one IP network connecting said controller to said private stations.

The invention finally relates to a computer program including program code instructions for executing the steps of the access control method described above when said program is executed by a computer.

The invention further relates to a private access station conforming to the system of the invention.

BRIEF DESCRIPTION OF THE DRAWINGS

Other advantages and features of the invention become more clearly apparent on reading the following description of one particular embodiment of the invention, chosen by way of illustrative and non-limiting example, and from the appended drawings, in which.

DETAILED DESCRIPTION

Figure 1:
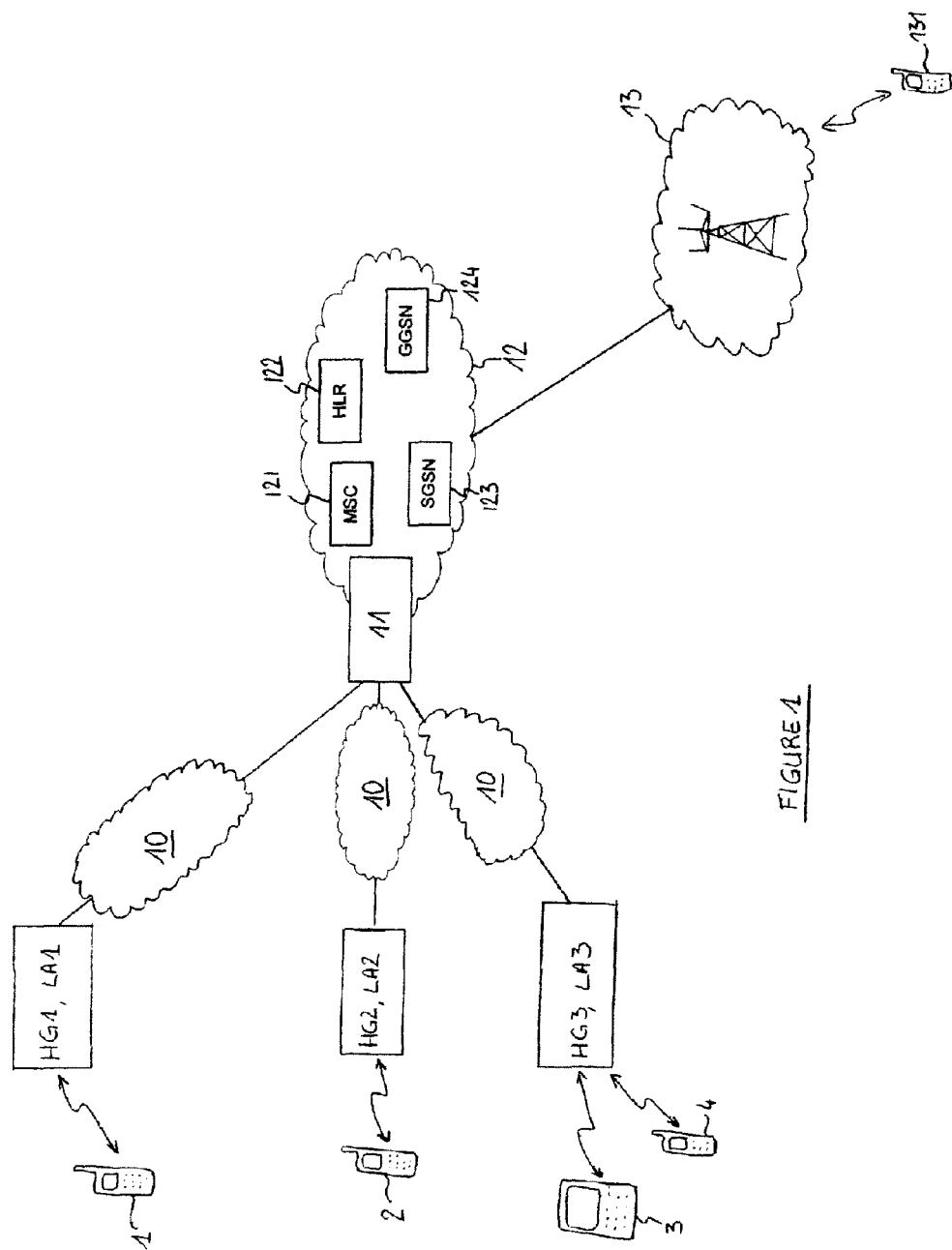
FIG. 1 illustrates the architecture of an private access station network of the invention, managed by a controller serving as a gateway between the access network dedicated to the home wireless coverage service and the core network.

In the context of introducing a new service offering an operator's subscribers home wireless coverage from private access stations, the general principle of the invention lies in the construction of an access network that is dedicated to that service from these home gateways and the architecture of which provides for access control that is differentiated as a function of a user category.

It should be noted that, throughout the present document, the expression home wireless coverage refers to wireless coverage accessible from a private wireless access station access to which is restricted to certain authorized subscribers, whether in a home, collective or business context.

In the context of the invention, the expression private access station (or home gateway (HG)) refers to a unit installed on the premises of a user (individual, association or business) that provides wireless access from the user's terminal to the IP/DSL (Internet Protocol/Digital Subscriber Line) transport network. This can in particular be a home gateway connected to the ADSL network, equipped with a 3G UMTS wireless antenna, and including a UMTS/IP interface module between the wireless antenna and the home gateway.

Control of access to these home gateways HG is effected the gateway HG itself and/or in a controller, which is a unit that is installed on the premises of the operator and that manages the home gateways HG. All the traffic of the end user of the gateway HG (incoming and outgoing traffic) is managed by the controller.

The present invention is applicable to 2G (GSM, GPRS), 3G (UMTS) cellular networks, and future evolutions thereof.

In second generation networks, the home gateway is like the base transceiver station (BTS) installed on the premises of the customer and the controller is like the base station controller (BSC).

In third generation networks, the home gateway is like a Node B installed on the premises of the customer. It can optionally have functions that are usually associated with entities of the 3G network, such as the RNC (Radio Network Controller), the MSC (Mobile Switching Center) or the SGSN (Serving GPRS Support Node). The controller is like an RNC but, in a preferred embodiment of the invention, has additional functions related to the access control mechanism of the invention: the controller interprets and generates level 3 messages (level 3 is the network layer of the OSI (Open System Interconnection) model or the Non Access Stratum in 3GPP terminology), which, in a standard UMTS network, are usually transported transparently between the user mobile terminal and the MSC and/or the SGSN.

The remainder of the description is devoted to describing one particular embodiment of the invention in the context of a UMTS network. In this embodiment, control of access to the home gateways is effected in a controller, for reasons associated with the performance of the home gateways.

Alternatively, effecting access control only in the home gateways HG themselves could be envisaged.

FIG. 1 illustrates the architecture of an access network dedicated to a home wireless coverage service, comprising a plurality of home gateways, of which three HG1, HG2, and HG3 are represented.

An access control mechanism is implemented in the home gateways HG1, HG2, and HG3: a given gateway HGi is associated with a list of UMTS subscribers (identified by their IMSI) authorized for this gateway. Subscribers absent from this list are not authorized for this gateway. In the context of a home gateway, these subscribers can comprise all users residing in the home, as well as certain relatives or friends of the family. In the context of a business home gateway, these authorized subscribers correspond to some or all of the staff of the business. With a gateway HG installed in a media center, the list of authorized subscribers could correspond to all members of the center.

The gateways HGi, i=1 . . . 3 are assigned location areas LAi (i=1 . . . 3) that are different (at least for adjacent home gateways). The consequence of this is to trigger a location area update procedure (as described in the 3GPP technical specification TS 24.008 referred to above) in a mobile terminal 1 to 4 when it attempts to attach to a 3G home gateway. According to the invention, the location areas LAi, i=1 . . . 3 are then very small compared to the location areas LA of the "macro" UMTS network of the operator.

Systematically triggering a location update procedure by the mobile terminal enables the implementation of an access control mechanism that rejects subscribers on the smallest possible unit of the access network dedicated to the home wireless coverage service, namely the location area LA.

The home gateways HG1, HG2, and HG3 are organized as an access network dedicated to the home wireless coverage service, to which is assigned a PLMN code different from the PLMN code assigned to the "macro" UMTS network of the operator. This PLMN can be declared as "equivalent" to the "macro" PLMN.

By means of this declaration of the equivalent nature of the PLMN networks, a subscriber mobile terminal 1 can attach to a cell associated with a home gateway HG1 with the same priority as to a cell of the "macro" UMTS network 13 of the operator. A mobile terminal, when switched on, must manually or automatically select the PLMN it wishes to access. It determines its priority PLMN by consulting the PLMN code in its IMSI, stored in its SIM (Subscriber Identity Module) or USIM (UMTS Subscriber Identity Module) card.

Accordingly, taking the example of an operator managing a "macro" UMTS network 13 having a PLMN code 208 01, an equivalent PLMN can be constructed from the home gateways HG1 to HG3 in accordance with the principle of the invention, which network is assigned a PLMN code 208 99. The IMSI 208 01 of the subscribers of the operator do not need to be modified (or their SIM/USIM cards changed) for the subscribers to the service to attach interchangeably to a cell of the "macro" network 208 01 or to a cell associated with a home gateway of the "micro" network 208 99. In both situations, users can consider themselves "at home", in a network managed by the operator to which they subscribe.

To be more precise, the system of the invention comprises home gateways HG1 to HG3 combined to form an access network dedicated to the home wireless coverage service, each of which is connected to a controller 11 via an IP network 10, such as the Internet or an ADSL network. The controller 11 constitutes a gateway between the access network consisting of the home gateways HG1 to HG3, of which it is part, and the operator's core network 12, which manages the service offered and the routing of calls to fixed networks (not represented in FIG. 1) such as the public switched telephone network, the Internet, etc.

The core network 12 comprises a number of standard UMTS entities, such as:
  a Mobile Switching Center (MSC) 121, which is responsible for managing circuit mode services of the mobile stations 1 to 4 and 131 that are registered in the geographical area that it manages;
  a Home Location Register (HLR) 122, which is a database containing information concerning the user's subscription terms and conditions and the features of the services subscribed to; it also contains coarse information on the location of the subscriber (such as the MSC or the SGSN at which the subscriber is located); and
  a Serving GPRS Support Node (SGSN) 123 which transfers data in packet mode to the Internet, to Intranet networks or to the service platforms (and vice-versa); this connection is effected via a data routing gateway 124 called the Gateway GPRS Support Node (GGSN).

Their roles and functions are identical to those of a conventional UMTS network and are therefore not described in more detail here.

FIG. 1 also represents the operator's "macro" UMTS network, in the form of an access network 13 consisting of base stations (base stations), accessible from a plurality of user mobile terminals 131, this access network being connected to the core network 12.

Each home gateway HG1 to HG3 is accessible to one or more authorized subscriber terminals. For example, only the mobile terminal 1 is authorized at the gateway HG1, to the exclusion of all the other mobile terminals represented in FIG. 1, whether they subscribe to the home wireless coverage service (terminals 2 and 3-4, which are respectively authorized at the gateways HG2 and HG3) or not (mobile terminal 131).

In a first embodiment, a list of the terminals authorized at a given home gateway HGi is stored in the controller 11 in a dedicated database.

In a second embodiment, this list is stored in a database of the network, for example, and loaded into the home gateway HGi when it is powered up, so that it can store it locally.

The mobile terminals shown in FIG. 1 can be cellular mobile radiocommunications terminals, communicating personal digital assistants (PDA), communicating laptop computers, or smartphones, all able to communicate with the operator's network. These are standard UMTS mobile terminals that do not need to be modified to be usable in the context of the invention.

The mechanism controlling access to the gateways HG1 to HG3 is implemented in the controller 11, and entails differentiating UMTS subscribers attempting to attach to the UMTS home gateway system of the invention, in order to reject them differently.

The following subscriber categories are defined, for example:
  subscribers of the mobile operator (UMTS) who subscribe to the home wireless coverage service (namely in FIG. 1 the users of the terminals 1 to 4);
  subscribers of the mobile operator (UMTS) who do not subscribe to this service, for example the mobile terminal 131; and non-subscribers of the mobile operator (UMTS), i.e. international or national "roamers".

Figure 2:
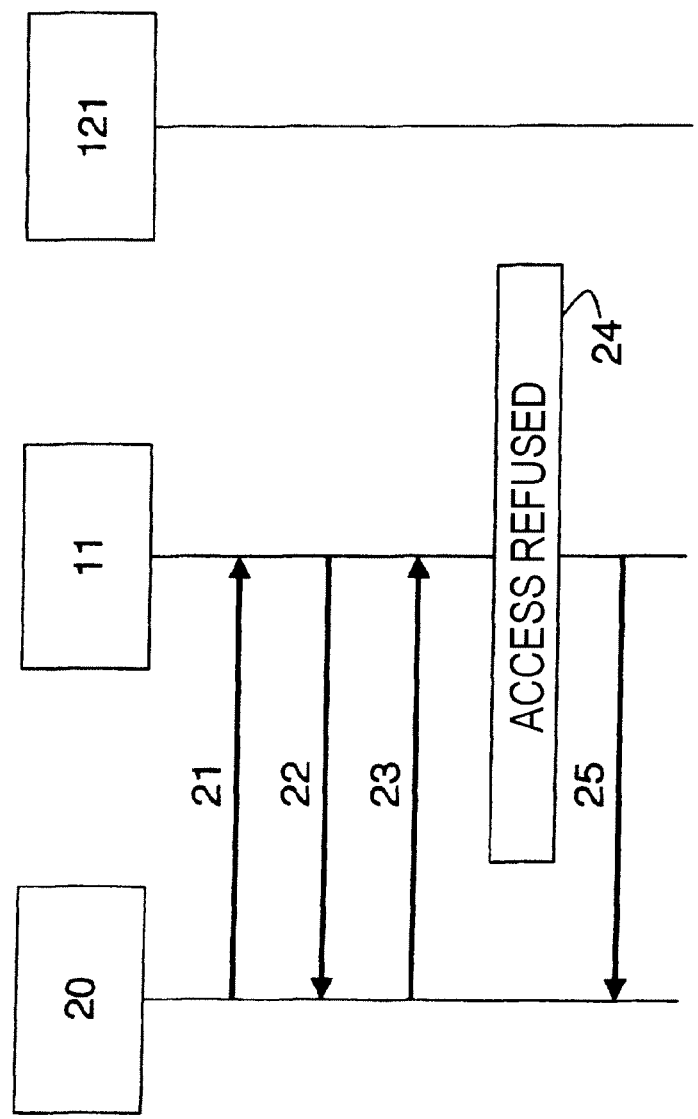
FIG. 2 represents more precisely an access control mechanism of the invention in the context of a location update procedure initiated by a user terminal.

The subscriber rejection mechanism is described below with more particular reference to FIG. 2, in the context of a location update procedure initiated by a mobile terminal. Such location updating procedures are described in the 3GPP technical specification TS 24.008 referred to above, which should be consulted for more information on its mode of operation.

This location updating procedure is initiated by a user mobile terminal 20 when it attempts to attach to a home gateway HG1, HG2 or HG3, because the system of the invention is based on associating a separate location area LA1 to LA3 with each of the home gateways.

The mobile terminal 20 sends a Location Updating Request message (SSN=0) to the controller 11, which in response sends the mobile terminal 20 an identity request (IMSI) message 22. The request 21 is sent from the mobile terminal 20 to the controller 11 via the home gateway (not represented in FIG. 2) to which the terminal 20 is attempting to attach and the IP network 10.

The mobile terminal 20 then sends the controller 11 an identity response (IMSI, SSN=1) message 23.

The controller 11 then determines if the user of the mobile terminal 20 is included in the list of subscribers authorized to access the home gateway concerned, by comparing its IMSI to those of the subscribers included in the list of users authorized at the gateway. In this embodiment, this list is stored in the controller 11, in a database comprising a set of (IMSI, HGi) pairs associating a home gateway HGi managed by the controller 11 and the identifier IMSI of a subscriber authorized to access it. If the user of the mobile terminal 20 is not included in the list of authorized subscribers, access to the gateway is refused (24).

In another embodiment, the list of subscribers authorized to access a home gateway is stored in the home gateway itself (for example, stored in the network and downloaded into the station when it is powered up, for performance reasons). In this situation, which is not represented in FIG. 2, the location update request 21 sent by the mobile terminal 20 is received by the home gateway, which in response sends the mobile terminal 20 an identity request (IMSI) message 22. The home gateway then compares the IMSI received with the list of authorized subscribers stored locally. If the user of the mobile terminal 20 is not included in the list of authorized subscribers, access to the gateway is refused. The station then sends the controller 11 the request 21 from the mobile terminal 20, where appropriate with its IMSI.

It should be noted that in this second embodiment access control proper is divided between the two nodes consisting of the home gateway and the controller.

Other variants could of course be envisaged for storing the list of subscribers authorized at a gateway.

The controller 11 then determines more precisely the category to which the user of the mobile terminal 20 belongs. Two main methods of achieving this can be envisaged.

In a first method, the controller 11 identifies international and national roamers by their IMSI. The IMSI is the permanent identifier of the mobile for the network and consists of:
the code of the subscriber's home country, namely their MCC (Mobile Country Code) coded on 3 digits;
the code of the nominal PLMN of the subscriber, namely the MNC (Mobile Network Code) coded on 2 digits; and
the number of the mobile subscriber within the network (MSIN).

International roamers have an MCC different from that of the network of the operator concerned. National roamers have an MCC identical to that of the network of the operator concerned, but a different MNC, which enables the controller to identify them.

When the controller 11 determines that the IMSI of the mobile terminal 20 has an MCC and an MNC characteristic of the subscribers of the operator concerned, it consults a database in the core network 12 to determine if the user of the mobile terminal 20 subscribes to the home gateway home wireless coverage service or not. This kind of database can be centralized and interrogated by all controllers when a number of controllers have been deployed to manage all of the home gateways HG. The subscribers included in the database are subscribers to the service and subscribers not included in the database are considered as non-subscribers to the service.

In a second method, as in the first, the controller 11 identifies international and national roamers on the basis of their IMSI. In contrast, for users having MCC and MNC codes characteristic of the subscribers of the operator concerned, the controller 11 identifies those users who subscribe to the service as a function of the MSIN in the IMSI. In this embodiment, certain of the 10 digits of the MSIN are assigned a value characteristic of the home wireless coverage service. Thus certain IMSI tranches are reserved for the subscribers to the service. If the prefix or prefixes reserved for subscribers to the service are declared in the controller 11, it can discriminate subscribers to the service on the basis of the subscriber's IMSI without interrogating an external database.

Access of the mobile terminal 20 to the home gateway HG concerned is therefore refused (24) by the controller 11 if:
the user of the mobile terminal 20 is a subscriber of the operator and subscribes to the home wireless coverage service but is not one of the authorized users for the home gateway concerned;
the user of the mobile terminal 20 is not a subscriber of the operator; or
the user of the mobile terminal 20 is a subscriber of the operator but does not subscribe to the home wireless coverage service.

In these circumstances, the controller 11 sends the mobile terminal 20 a Location Updating Reject message 25 that contains a specific cause of rejection, as a function of the category determined for the user.

For example, the causes of rejection #11, #12, #13, and #15 of the above-mentioned 3GPP technical specification TS 24.008 (§4.4.4.7 "Location updating not accepted by the network" and appendix G) can be used.

Thus national or international roamers and non-subscribers to the home wireless coverage service can be rejected with a cause #11, "PLMN not allowed", the effect of which is to store in the mobile terminal 20 the identifier of the PLMN of the access network dedicated to the service in a forbidden PLMN list. Thus roamers and non-subscribers to the service are rejected on a quasi-permanent basis (i.e. until the mobile terminal 20 is switched off and on again, the effect of which is to update this list) in the network of the home gateways HG1 to HG3. They are therefore forced to remain at the level of the "macro" UMTS network of the operator. When a PLMN is stored in the forbidden PLMN list, signals coming from its cells are no longer measured at the wireless level.

Subscribers in the category of subscribers to the service can be rejected with a cause #15 ("No suitable cells in the Location Area") or #12 ("Location Area not allowed") or #13 ("Roaming not allowed in this Location Area"), so as to reject them at the home gateway concerned, but not to block them at another home gateway, for example that of their home.

The user is therefore blocked at a location area LA, i.e. a particular Home Gateway, that is prohibited to them. However, on approaching the home gateway of their business or home, where they are listed as an authorized user, they can attempt to attach to that home gateway in the normal way.

The access control mechanism of the invention therefore proves to be particularly effective, as installing the home wireless coverage service has no impact on the performance of the mobile terminals of non-subscribers to the service. After a first rejection on a first attempt to connect to a home gateway, non-subscribers to the service no longer attempt to attach to these home gateways, the presence of which therefore no longer disturbs them.

Rejection causes other than those already provided in the above-mentioned 3GPP specification could be envisaged, of course, the causes mentioned herein being by way of example only.

The person skilled in the art can readily transpose the above description of one embodiment in which controlling access to a home gateway as a function of the category determined for a user is effected in a controller, to the situation in which access control is effected exclusively in the home gateways. The means employed and the messages exchanged with the mobile terminal are the same, but at the level of the home gateway and no longer at the level of the controller.

In one particular embodiment of the invention, the steps of the access control method of the invention are determined by the instructions of a computer program incorporated in a data processing device such as the controller 11. The program includes program instructions which, when such program is loaded into and executed in the device whose operation is then controlled by the execution of the program, execute the steps of the method of the invention.

Consequently, the invention also applies to a computer program, in particular a computer program on or in an information storage medium, adapted to execute the invention. This program can use any programming language and take the form of source code, object code or an intermediate code between source code and object code, such as a partially-compiled form, or any other form desirable for implementing the method of the invention.

The invention claimed is:

1. A system for controlling access to a service of a mobile operator, wherein said service is accessible via a plurality of home gateways forming private stations to a communications network, said system comprising:
    an access network dedicated to said service comprising said private stations collectively formed together, each of said private stations being provided with a respective location area; and
    means activated in an event of a location updating procedure initiated by a user terminal:
        for determining a category to which said user belongs, said category depending on a status selected from the group consisting of (i) the user is subscribed to said service, (ii) the user is not subscribed to said service but is subscribed to the mobile operator, (iii) the user is not subscribed to said service and is not subscribed to the mobile operator, and (iv) the user is subscribed to said service and is subscribed to the mobile operator but is only authorized for at least one but less than all of the plurality of home gateways; and
        for controlling access by said user terminal to one of said private stations, as a function of the category so determined; and
    in the event of refusal of access to said user terminal to one of said private stations, said access control means are adapted to send said terminal a refusal message including a rejection cause that is a function of the category determined for said user.

2. A system according to claim 1, wherein said determination means comprise means for comparing at least one identifier of the user with a reference identifier associated with the service.

3. A system according to claim 2, wherein the determination means further comprise means for looking up a user in a database of subscribers to the service.

4. A system according to claim 1, wherein said determination means are adapted to determine if said user is included in a list of at least one user authorized to access said private station.

5. A system according to claim 1, comprising at least one controller associated with said private stations, adapted to use said category determination means and said access control means.

6. A system according to claim 1, wherein said category determination means and said access control means are included in said private stations.

7. A system according to claim 1,
    wherein said means for determining a category to which said user belongs and said means for controlling access by said user terminal are implemented by at least one controller connected to said private stations through at least one IP network.

8. A method of controlling access to a service of a mobile operator, wherein said service is accessible via a plurality of private access stations to a communications network, said method comprising:
    aggregating said private stations into an access network dedicated to said service;
    associating each of said private stations with a respective location area;
    in an event of a location updating procedure initiated by a user terminal:
        determining a category to which said user belongs, said category depending on a status selected from the group consisting of (i) the user is subscribed to said service, (ii) the user is not subscribed to said service but is subscribed to the mobile operator, (iii) the user is not subscribed to said service and is not subscribed to the mobile operator, and (iv) the user is subscribed to said service and is subscribed to the mobile operator but is only authorized for at least one but less than all of the plurality of home gateways;
        controlling access by said user terminal to one of said private stations, as a function of the category so determined; and
    in the event of refusal of access by said user terminal to one of said private stations, said access control step includes sending said terminal a refusal message including a rejection cause that is a function of the category determined for said user.

9. A non-transitory computer-readable medium having embodied thereon a computer program comprising program code instructions for executing the steps of the access control method of claim 8 when said program is executed by a computer.

10. An access station to a communications network, wherein said station is a private access station belonging to a set of private access stations to a service of said network of a mobile operator, aggregated into an access network dedicated to said service, and with each of which is associated a different location area and in that it is adapted to use during a location updating procedure initiated by a user terminal:

means for determining a category to which said user belongs, said category depending on a status selected from the group consisting of (i) the user is subscribed to said service, (ii) the user is not subscribed to said service but is subscribed to the mobile operator, (iii) the user is not subscribed to said service and is not subscribed to the mobile operator, and (iv) the user is subscribed to said service and is subscribed to the mobile operator but is only authorized for at least one but less than all of the plurality of home gateways; and means for controlling access by said user terminal to one of said private stations, as a function of the category so determined, said access control means being adapted, in the event of refusal of access by said user terminal to one of said private stations, to send said terminal a refusal message including a rejection cause that is a function of the category determined for said user.

11. A system for controlling access to a service of a mobile operator, wherein said service is accessible via a plurality of home gateways forming private stations to a communications network, said system comprising:

an access network dedicated to said service comprising said private stations collectively formed together, each of said private stations being provided with a respective location area; and means activated in an event of a location updating procedure initiated by a user terminal:

for determining a category to which said user belongs, said category depending at least on whether the user subscribes to said service; and for controlling access by said user terminal to one of said private stations, as a function of the category so determined, wherein in the event of refusal of access to said user terminal to one of said private stations, said access control means are adapted to send said terminal a refusal message including a rejection cause that is a function of the category determined for said user, and wherein said means for determining a category to which said user belongs and said means for controlling access by said user terminal are implemented by at least one controller connected to said private stations through at least one IP network.

\* \* \* \* \*